United States Patent Office 3,634,365
Patented Jan. 11, 1972

3,634,365
POLYMERS OF L-AMINO ACID DERIVATIVES OF S-(SUBSTITUTED BENZYL) COMPOUNDS
Carleton W. Roberts and Daniel H. Haigh, Midland, Mich., assignors to The Dow Chemical Company, Midland, Mich.
No Drawing. Continuation-in-part of application Ser. No. 558,611, June 20, 1966, which is a continuation-in-part of application Ser. No. 114,608, June 5, 1961. This application Aug. 27, 1969, Ser. No. 853,518
Int. Cl. C08g 20/04
U.S. Cl. 260—78 A 3 Claims

ABSTRACT OF THE DISCLOSURE

L-amino acid derivatives of S-(substituted benzyl) compounds, such as S-(vinylbenzyl)-L-cysteine or methionine and various aromatic-substituted derivatives thereof; and homopolymers of the said substances, or their copolymers with other, copolymeric ethylenic substances; the compounds are useful in the resolution of racemic mixtures of amino acids and as insecticides and herbicides.

This application is a continuation-in-part application of U.S. Ser. No. 558,611 filed June 20, 1966 which in turn was a continuation-in-part application of U.S. Ser. No. 114,608 filed June 5, 1961.

DESCRIPTION OF THE INVENTION

The invention is directed to S-(substituted benzyl)-L-amino acid compounds. The compounds can be non-polymers corresponding to the formula

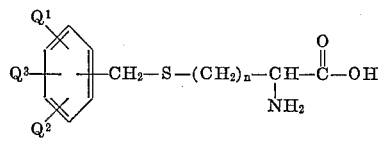

wherein each of $Q^1$, $Q^2$, and $Q^3$ is independently selected from phenyl, lower alkyl, cyclohexyl, halogen or nitro, and one of $Q^1$, $Q^2$, and $Q^3$ can be vinyl or isopropenyl, $n$ is an integer, 1 or 2, and the amino acid moiety is the L-stereoisomer; wherein lower alkyl is alkyl of from 1 to 4, inclusive, carbon atoms, and halogen is fluoro, chloro, bromo, or iodo.

The present compounds can also be addition polymers, the polymeric aspect of which is typical of ethylenic polymers, as from the linear homopolymerization of the monomers when one of $Q_1$, $Q_2$ and $Q_3$ is vinyl or isopropenyl. In this situation, the products are solid, usually insoluble polymers of recurring units of the formula

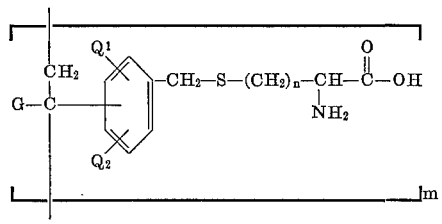

wherein G is hydrogen or methyl and the moiety

is the saturated residue in a polymer hydrocarbon chain, or "backbone" from the vinyl or isopropenyl formerly represented in one of $Q_1$, $Q_2$, or, as here, $Q_3$ and $m$ represents the degree of polymerization, and typically is an integer, usually of an average value from about 25 to a very high number such as 100,000 or, more commonly, from about 125 to several thousand, such as 5,000.

The present compounds include also polymers such as those described foregoing, but modified in that they are crosslinked rather than linear polymers. In preparing such crosslinked polymers, depending upon the desired degree of crosslinking, from about 0.01 to as much as 99 mole percent of starting material can present a plurality of ethylenic unsaturation. When it is desired to retain the property of swelling in solvent but not dissolving relatively lower proportions of polyunsaturated monomers will be required, such as from 0.01 to 5 mole percent by weight of monomer. When a very densely crosslinked product is desired, higher proportions of polyunsaturated monomer, such as from about 4 to essentially all the monomer can carry plural ethylenically unsaturated polymerizable moieties.

Crosslinking is also achieved by the inclusion in the polymerizable mixture of a portion, such as from 0.01 to about 25 and more usually from about 0.1 to about 10 mole percent of polymerizable mixture of a polyfunctional monomer that has no function other than as crosslinking agent. Divinylbenzene is illustrative. Such copolymers are represented by the formula

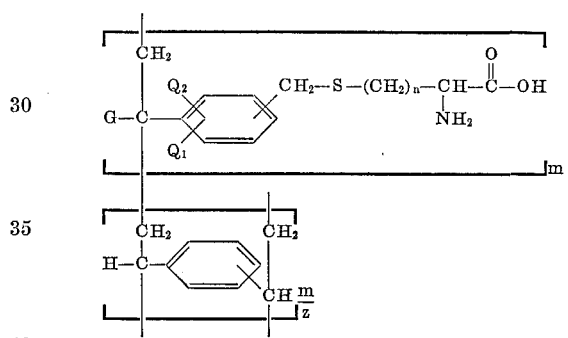

wherein $z$ is an integer from 1 to about 20,000,000. It is understood here that the bonds shown passing beyond the factorial brackets and not otherwise attached are attached in manners conventional for such polymers: to other monomeric residues as shown, or to routine chain-terminating groups. The value of $m/z$ is characteristically about 50 to 1,000.

The novel non-polymers, including the monomers, wherein one of $Q^1$, $Q^2$, or $Q^3$ is vinyl or isopropenyl, are at room temperature, crystalline solids somewhat soluble in many common organic solvents such as ethanol and acetone, and of very low solubility in water. The novel polymers are amorphous and their physical properties depend upon average or mean degree of polymerization (that is, macromolecular weight,) degree of crosslinking, and other factors. Copolymers of the present monomers with other ethylenically unsaturated copolymerizable substances are also useful and by judicious selection of co-members of such copolymer, physical properties of resulting product can be controlled over a wide range, while yet exhibiting the benefits and advantages of the presence, in such copolymer, of the moieties derived from the novel monomers. In all the present polymers, the polymerization is by ethylenic addition.

Representative such copolymerizable substances that appear in copolymeric products to modify the general physical properties of the resulting copolymers usefully include styrene; vinyltoluene, ar-ethyl styrene, tertiary butyl styrene, and α-methyl styrene. Thus the present polymers can contain residues from addition polymerization of lower alkyl styrenes.

Amounts of such comonomeric components will vary according to the physical properties desired, but will typically be from about one such comonomer per novel monomer unit of this inevntion to one such comonomer per 200 novel monomer units; and these can be linear or crosslinked as hereinbefore set forth. Such copolymers when crosslinked, can be represented by the conventionalized formula

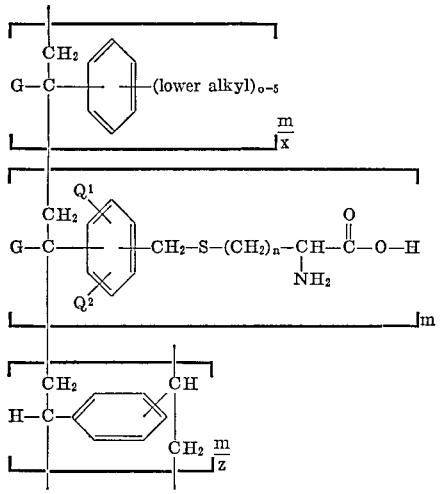

wherein $x$ is an integer from 1 to about 200 and all other symbols have the values hereinbefore set forth.

While the present novel monomers can be homopolymerized or copolymerized with ethylenically unsaturated non-polymers of great variety, in order to enjoy the advantages and benefits of the present invention, particularly the benefits of resolution of racemic mixtures of amino acids as is more fully set forth hereinafter, the co-members of copolymers should, in general, be derived from monomers corresponding to the formula

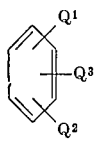

wherein each of $Q^1$, $Q^2$, and $Q^3$ has the values hereinbefore specified, provided that one such group is vinyl or isopropenyl, as a site for polymerization. It will be noted that the definitions of such radicals exclude, as ring substituents, functional groups whose functionality might interfere with the desired resolution of enantiomorphs of amino acids. The desired resolution is effected by the recurring amino-acid-bearing units: hence such units should be present as a substantial proportion of the total recurring units in the polymer. Homopolymers of such sort are usually the most effective resolving resins.

The present compounds are useful in resolution of racemic mixtures of stereoisomers of certain amino acids. In this use, because of their physical properties, the polymers are usually preferred. Copolymers are also effective, their resolving power appearing to depend upon the presence of recurring units derived from the present amino-acid-bearing monomers. Also, the compounds are useful as insecticides and herbicides, and as advantageous intermediates especially adapted to the synthesis of compounds of classes of whose members many exhibit important biological activity.

The new polymeric resins are prepared, in one method, by first preparing a precursor which is the reaction product of an amino acid containing sulfur, such as cystine or methionine and an alkali metal, in liquid ammonia as reaction medium, whereby there is obtained an intermediate substance which is usually separated from reaction medium. The intermediate substance thus prepared is then heated with a ring-substituted benzyl halide polymer having recurring units of the formula

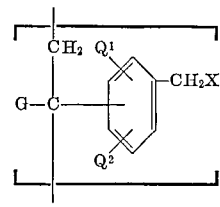

wherein X represents a halogen, typically chlorine, and wherein other symbols have the values previously set forth. Equally X represents a dimethylsulfonium chloride group, $-S-(CH_3)_2 \cdot Cl$. The polymer chain bonds can be occupied so as to provide any of the types of polymers hereinbefore shown.

While the present invention rests upon its own merits and is not to be limited by theoretical considerations which may or may not prove upon further examination, to be correctly predicated, the steps in the synthesis of the novel compounds by which the amino acid moiety is bonded to the halomethyl or dimethyl sulfonium chloride-bearing aromatic nucleus appears to take a course of which the following non-polymeric skeletal equations are illustrative:

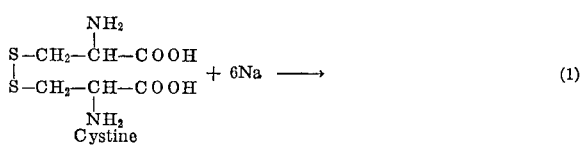

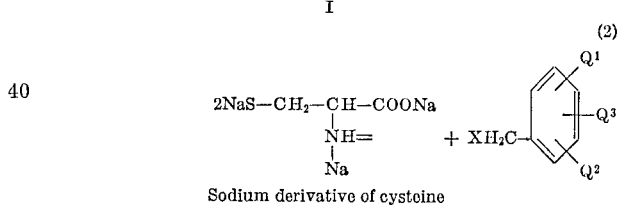

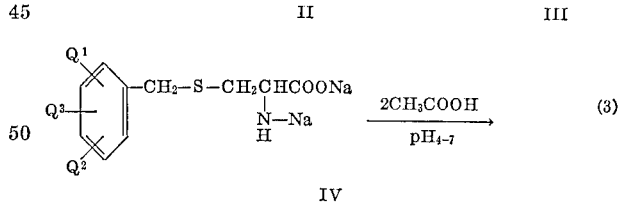

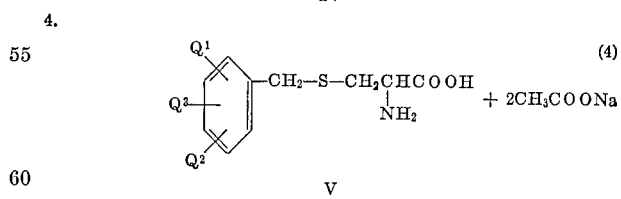

Thus, upon the completion of the heating of the substituted benzyl halide with the sodium derivative of the amino acid, there is apparently formed an alkali metal derivative of the desired compound, which, upon treatment with a mild acid, such as acetic acid, at a pH in the range of 4 to 7, preferably approximately 5, gives up the alkali metal ions, yielding the desired compounds of the present invention.

The L-amino acid (I) may be cystine or methionine. In the above equations cystine is shown as illustrative. The substituted benzyl halide (III) may be a non-polymeric substance such as a chloromethylated ethylbenzene or styrene: or a polymeric substance, such as a chloromethylated polystyrene, linear or crosslinked. When employed a halomethylated polystyrene, the halomethyl group $XCH_2$— need appear on only those aromatic nuclei or the proportion of aromatic nuclei upon which it is desired to attach the sulfur-containing amino acid group. Instead of a benzyl halide, a dimethylsulfonium derivative of the same is also usefully employed.

Although, in the foregoing formulas the desired compound is shown to exist in the form of an α-amino acid, that is to say, an acid upon the α-carbon of which there are both a carboxyl and an amino group, it is to be understood that at a pH in approximately the range of 4.9 to 5.1 the instant compounds are at their isoelectric point and exist as, or in equilibrium with, the zwitterion form.

In carrying out the preparation of the present compounds, metallic sodium and cystine or methionine are added slowly, portionwise, and with stirring through an appropriate addition port to liquid ammonia which is conveniently maintained in the liquid form by the application of external refrigeration and is boiling, under reflux, at its boiling temperature, approximately —33 to —34° C. Reflux may be maintained with appropriate external cooling of the condenser, conveniently by the use of solid carbon dioxide ("Dry Ice"). One molecular equivalent of cystine, in the form of its polysodium derivative, reacts with each two molecular equivalents of the substituted benzyl halide to be employed; sodium is employed in an amount slightly greater than that stoichiometric with the employed cystine, upon the assumption that 6 atoms of sodium react with each molecule of cystine. Half that atomic proportion of sodium is required per mole of methionine. The desired amount of sodium can readily be calculated or, if desired, may be ascertained visually with accuracy greater than theoretical by watching the reaction mixture during the addition of reactants. Upon the completion of the addition of amino acid further sodium is added until the reaction mixture just turns to steady blue, the color of free sodium dissolved in liquid ammonia. This color can be dispelled and the reaction mixture brought into balance by the subsequent addition of minute amounts of ammonium chloride. The first step reaction mixture thus prepared comprises the polysodium derivative of cysteine or methionine in liquid ammonia. To the first step reaction mixture thus prepared, there is added the substituted benzyl chloride which may be its polymer a chloromethylated polystyrene, slowly, portionwise or at a slow continuous rate, over a period of time, as the reaction mixture continues to reflux at the reflux temperature of liquid ammonia. Following the completion of the addition of the substituted benzyl halide, stirring is continued under reflux for a period of time to permit the reaction to go forward to completion. Thereafter, the reflux facilities are disconnected, and, at least on a laboratory scale, ammonia reaction mixture allowed to vaporize spontaneously under room temperature and escape, to obtain a dry product of reaction.

The resulting solid product, refrigerated, is quickly dissolved in abundant ice water, to avoid local overheating. The resulting solution is filtered cold and acidified with acetic acid to a pH of 7 to 4, usually about 5, whereat, when a non-polymer is prepared, a crystalline product of the present invention, typically white, precipitates and is separated in known manner, conveniently by filtration. The product may be further purified in ways which will be known to skilled chemists, including washing with water, recrystallization from the solvent mixtures and the like. Polymeric products tend to be glass-like in nature, characteristic of ethylenic, e.g., polystyrene, polymers. Other methods of synthesis will be made evident by reference to the following examples.

The following examples illustrate representative preparations of intermediate substances and product compounds according to the present invention.

EXAMPLE 1

Preparation of crosslinked poly(vinylbenzyl chloride) beads and the like

A convenient and preferred method for the preparation of crosslinked poly(vinylbenzyl chloride) in the form of small particles or beads especially adapted to be reacted further in the manner of the preparation of compounds of the present invention is applicable to the preparation of beads having a wide range of crosslinking for example from 0.01 to 10 percent crosslinking monomer in the starting mixture, for control of solubility. The isomeric positions upon the aromatic nuclei of the benzylchloride moieties and the relative proportion of divinylbenzene as well as the precise identity of the polymerization-promoting catalyst may be modified in various manners which, in view of the present specification, will become obvious to skilled chemists.

A representative preparation is carried out as follows:

A mixture is prepared consisting essentially of 194.7 grams (1.2 mole) of ar-vinylbenzyl chloride, 5.3 grams (a little less than 3 mole percent) of divinyl benzene (containing 75 percent by weight of actual divinyl benzene) 1 gram of benzoyl peroxide and 1200 milliliters water containing 2 percent water soluble cellulose ether ("Methocell"). The employed vinylbenzyl chloride is a mixture of which 40 percent contains the chloromethyl group in a position meta to the vinyl moiety and 60 percent contains the chloromethyl group in a position para to the vinyl moiety. The resulting mixture is heated at a temperature of about 75° C. and agitated over a period of 4 hours; thereafter the mixture is heated for 4 hours further at 85° C. and finally at 1 hour at a temperature of 100° C. At the conclusion of this time, by which time the mixture has essentially all polymerized with crosslinking, the mixture is filtered by suction and washed repeatedly with deionized water for a total amount of 5 liters to obtain, as relatively uniform beads of very low solubility in all solvents, a relatively highly cross-linked poly(vinylbenzyl chloride).

EXAMPLE 2

Preparation of crosslinked poly(vinylbenzyl dimethylsulfonium chloride)

The polymer product of Example 1 is suspended in a mixture of equal weights of water and isopropyl alcohol. To the resulting mixture is added 100 milliliters redistilled dimethylsulfide. The resulting mixture is agitated in a closed system for 96 hours whereby to bring about reaction between the dimethylsulfide and the polymer and to assure maximum possible conversion of the poly(vinylbenzyl chloride) to the dimethylsulfonium form. Conversion is about 70% of the original chloromethylated sites. In this form, the crosslinked poly(vinylbenzyl dimethylsulfonium chloride) superficially appears to be a thick, yielding, viscous gel. In fact, the discrete beads still exist in much swollen condition, but their outlines are not evident upon superficial examination. In this condition, the substance is immediately ready for further employment in the preparation of the compounds of the present invention.

EXAMPLE 3

In a two-liter, round bottomed flask of glass resistant to thermal shock and equipped with stirrer, Dry Ice reflux condenser, addition port and nitrogen inlet is placed 1 liter anhydrous liquid ammonia. With care in manipulative procedures, continuous cooling and continuous vigorous agitation, there are added to the said liquid ammonia a total of 120 grams of L-cystine (0.5 mole) and 46 grams (2 gram-atoms) metallic sodium. The cystine and sodium are added alternatively in small portions over an extended period of time. When all the cystine has been added and the resulting reaction has gone to completion to convert the cystine to the polysodium salt of cysteine and there is also present a small excess of sodium as shown by a persistent blue color of the liquid ammonia, a small portion of ammonium chloride is added to destroy the excess sodium.

Thereafter, ammonia solvent is permitted to vaporize and disappear completely; the resulting dry solid product is placed under sharply subatmospheric pressure for 1 hour and warmed at 40° C. to remove all traces of ammonia solvent. The resulting dry powder is placed under an atmosphere of nitrogen and in this condition is chilled over an ice bath. Under these conditions, there is added reactive polymer gel prepared as described in Example 2, in amount equal to 107 grams of dry substance. As a result of these operation there is obtained a thick, viscous slurry which is stirred at 65° C. for a period of 10 hours to carry the reaction to completion. Thereafter, the resulting product is chilled and vacuum filtered.

As a result of these operations, there is obtained a group of insoluble resin beads relatively swollen by the presence, within their structure, of liquids in which the polymer is not soluble. This group of swollen beads is washed repeatedly with dilute acetic acid to remove all unreacted cysteine, as ascertained by ninhydrin testing of replicate wash liquid portions. Thereafter, the resin beads are washed with replicate portions of deionized water to a total amount of 20 liters. The resulting beads are thereafter dried and analytically examined: it is ascertained that almost all of the dimethylsulfonium chloride sites react to form the S-substituted cystine polymer of the present invention.

Evaporative removal of the non-solvent liquid leaves the resulting essentially liquid-free bead deeply fissured with interstices by which the effective surface area is rendered much greater than the apparent spherical to subspherical bead surface area.

EXAMPLE 4

Preparation of S-(vinylbenzyl)-L-cysteine

In a two-liter, three-necked, round-bottomed flask fitted with a Dry Ice refrigerated condenser, air motor stirrer and addition port for dry solids, cooled in a Dry Ice-acetone bath, ammonia is condensed to obtain approximately 700 milliliters liquid ammonia. Upon completion of the condensation, the resulting liquid ammonia is permitted to reflux and thereto, during reflux, are added alternately, slowly, in small portions at a rate controlled in order not to exceed the reflux capacity of the reflux condenser, 20 grams (0.87 gram-atoms) metallic sodium and 48 grams (0.2 mole) L-cystine. Upon completion of addition of the said reactants, further metallic sodium is added to obtain a reaction mixture of a persisting distinct blue color. A few crystals of ammonium chloride are added thereto to dispel the blue color and obtain a nearly colorless first step reaction mixture.

To the said first step reaction mixture is added, with continuous stirring, portionwise, slowly and at such rate that evolved and introduced heat do not overtax reflux capacity, 60.8 grams (0.4 mole) ar-vinylbenzyl chloride. The addition takes place during 30 minutes. Upon completion of the addition of the said benzyl halide, the reaction mixture is further stirred for an additional 30 minutes to cause the reaction to go to completion. Thereafter, reflux apparatus is disconnected and, overnight, the ammonia reaction medium allowed to vaporize away, to obtain a dry intermediate product as a white residue. The white residue, in the reaction flask wherein it had been prepared, is chilled in an ice water bath, and taken up by the slow addition thereto of 1 liter of ice water, to obtain a yellow solution of the intermediate product. This solution is cold filtered and acidified to a pH of about 5 by the slow addition of acetic acid with a continuous stirring, whereupon a white crystalline product precipitates in the reaction mixture and is thereafter separated by suction filtration. The dry product upon the suction filter is thereafter washed with 5 liters water and vacuum oven dried at 65 to 70° C. for 36 hours. As a result of these operations there is obtained 85 grams (94.6 percent of theoretical yield) of S-(vinylbenzyl)-L-cysteine product. The product melts at 188–190° C. and, upon analysis, contains 60.63 percent carbon, 6.18 percent hydrogen, 5.75 percent nitrogen, and 13.61 percent sulfur as compared with theoretical values of 60.73, 6.37, 5.90, and 13.51 percent respectively.

In the preparation of the foregoing example, the starting vinylbenzyl chloride was a mixture of ortho- and para-isomers; the resulting product contained a mixture of ortho- and para-vinyl groups in the same proportion as were present in the starting vinylbenzyl chloride. The cysteine moiety was present as a zwitterion. The compound is also known as 3-vinylbenzyl-β-thioalanine.

EXAMPLE 5

Polymerization of S-(vinylbenzyl)-L-cysteine 47.5 grams, 0.2 gram mole, S-(vinylbenzyl)-L-cysteine is mixed with stirring and gentle heating into 200 grams mixed isomeric mono- and di-chlorobenzene as solvent, in a two liter round-bottomed flask equipped with magnetic stirrer, addition ports, and nitrogen blanket. Thereto, with continued heating at about 40° C. and stirring, are added 9 grams of styrene that contains also 10 weight percent, one gram, divinylbenzene. To the resulting mixture is added one liter water, and heating and stirring are continued until equilibrium temperature is attained. Catalyst is then added, in the form of 0.1 gram N,N'-azobis-(isobutyronitrile).

Heating and stirring, under constant nitrogen blanket, are continued for 48 hours, and thereafter discontinued. The resulting mixture is filtered warm, and residue is washed repeatedly with warm dichloromethane to a total volume of 100 cc.

As a result of these procedures, there is obtained, as a white, finely particulate, insoluble, crosslinked polymer, a copolymer of S-(vinylbenzyl)-L-cysteine, styrene, and a crosslinking amount of divinylbenzene. The product yield is approximately quantitative for the starting materials and, in a column, resolves a racemic amino acid mixture in the manner of the other products of this invention.

EXAMPLE 6

Resolution of racemic mixture by non-polymer

Non-polymeric S-(vinylbenzyl)-L-cysteine, preferably in the relatively stable zwitterion form, is useful in the resolution of racemic mixtures of stereoisomeric materials. dl-α-phenylethylamine is illustrative. The racemic amine is mixed intimately into and gently warmed with the non-polymeric S-(vinylbenzyl)-L-cysteine in the zwitterion form; the diastereoisomeric salts form, and are readily separated in fractional crystallizations in known techniques, and the resolved, or substantially resolved d- or l-α-phenylethylamines freed. The technique, using other resolving agents, is described in most organic chemistry texts.

EXAMPLE 7

The procedures of Example 4 are substantially repeated, employing the essentially pure para-isomer of vinylbenzyl chloride. The resulting product is a white, crystalline solid melting with decomposition in the range of 200–205° C. Structure is confirmed by infrared spectrum.

EXAMPLE 8

Preparation of polymeric S-(ar-vinylbenzyl)-L-cysteine

In the present example the procedures followed were essentially similar to those followed in Example 4 except that the benzyl halide employed was a chloromethylated polystyrene, essentially p-(chloromethyl)polystyrene. The employed polystyrene contained, as a copolymeric constituent, approximately 0.1 percent divinylbenzene to cause crosslinking and thus render the resulting substance less soluble than a similar non-crosslinked material would be. As a result of such crosslinking, the employed polymer had an average molecular weight of approximately 200,000,000.

In particular, in a two-liter, three-necked, round-bottomed flask fitted with a condenser refrigerated with solid carbon dioxide (Dry Ice), air stirrer and addition port for dry solids, cooled over a bath of acetone and Dry Ice, ammonia was condensed to obtain approximately 350 milliliters liquid ammonia. Sodium (10 grams, 0.44 gram atom) was added alternately with L-cystine (20.4 grams, 0.1 mole) slowly, portionwise, and over a period of time. Upon completion of the addition of the said reactants to the liquid ammonia, a slight excess of sodium was added, to obtain a persisting blue color. The color was dispelled by the addition of a few crystals of ammonia chloride. To the resulting first-step reaction mixture was then added, slowly, portionwise, and with continuous stirring over a period of approximately one half hour, 30 grams (0.2 mole) of dried, approximately spherical beads of the said chloromethylated polystyrene. Upon completion of the addition of the chloromethylated polystyrene, the resulting reaction mixture was refluxed at the temperature of boiling ammonia for 20 hours, to carry the reaction as far as possible towards completion. At the end of this period of time, reflux means were disconnected and the ammonia allowed to vaporize and escape. As a result of these operations, there was obtained a white solid residue of more or less coalescent subspherical particles of product, the outline of the said beads being greatly degraded. The dry product was cautiously treated by the addition of 20 percent acetic acid until the resulting solution had a pH of approximately 5.5. In this situation, the acidified solution was stirred overnight, completely to replace sodium with hydrogen at all sites. The resulting product contained suspended solid insoluble in the acidic menstruum. The suspended solid was removed by vacuum filtration and washed with 10 liters of deionized water and thereafter dried under subatmospheric pressure for 6 hours at 35° C. The resulting product was analyzed by infrared spectroscopy and by elemental analysis. The assigned structure was confirmed, and the elemental analysis established that approximately 10 percent of the chloromethylated sites on the starting chloromethylated polystyrene had been substituted by cystine. This represents substantially more than the proportion of the said sites at the hypothetical simple spherical surface of the beads. When a higher proportion of amino acid substitutions is desired, smaller particles of polymer are employed.

EXAMPLE 9

In a two-liter, three-necked, round-bottomed flask fitted with a stirrer, Dry Ice condenser, and refrigerated over a bath of acetone chilled with dry ice, ammonia was condensed to obtain approximately 800 milliliters liquid ammonia. Sodium (20 grams; 0.87 gram-atom) was added alternately with L-cystine (48 grams; 0.2 mole). When all of the L-cystine was thus converted to the disodium salt of L-cysteine, the temperature of the flask was allowed to equilibrate slowly with room temperature to evaporate the ammonia. The flask was then connected with a vacuum line and its internal space placed under subatmospheric pressure to insure complete removal of the ammonia. Thereafter there was added to the solid remaining after evaporation of ammonia 859 grams of a 10 percent solution of a linear poly(vinylbenzyl dimethylsulfonium chloride) diluted with 700 milliliters of 30 percent isopropyl alcohol. Upon completion of the addition of the said polymeric reactant, the temperature of the resulting reaction mixture was raised to 55° C. and maintained thereat for 6 hours. Thereafter, the resulting mixture was allowed to cool to room temperature and permitted to stand at that temperature (20–24° C.) for 16 hours. At the conclusion of this period of standing, glacial acetic acid was added thereto to coagulate the resulting polymer which was then separated by filtration and dried to obtain a white powdered polymeric S-(ar-vinylbenzyl)-L-cysteine product. The product was found upon analysis to have contents of carbon, hydrogen, nitrogen and sulfur of 61.36, 6.74, 4.75, and 13.10 percent by weight of total product respectively, as compared with theoretical values of 60.74, 6.37, 5.90, and 13.51 percent by weight of product respectively for a poly(S-(ar-vinylbenzyl)cysteine) wherein the cysteine moiety appears as substituent upon each recurring benzyl group.

The assigned structure was confirmed by infrared analysis.

EXAMPLE 10

Preparation of poly(S-(ar-vinylbenzyl)cysteine)

In the present example, the principal difference from Example 9, foregoing, is found in the fact that the employed polymeric vinyl benzyl halide starting material was crosslinked whereby to inhibit solubility of the resulting product.

In a two-liter, three-necked, round-bottomed flask fitted with stirrer, Dry Ice chilled condenser, and refrigerated over a bath of acetone and Dry Ice, ammonia was condensed to obtain approximately 700 milliliters liquid ammonia. Sodium (15 grams; 0.65 gram-atom) was added alternately with L-cystine (31.2 grams; 0.13 mole). When all the cystine had been added, and was thereby converted to the polysodium salt of cysteine, the temperature of the flask was allowed slowly to equilibrate with room temperature whereby to vaporize and remove the ammonia. Thereafter, the flask was connected with a vacuum line and its interior contents exposed to subatmospheric pressure to insure complete removal of the ammonia. Upon completion of removal of ammonia, there was added to the resulting dry flask contents 428 grams (0.2 mole) of a 10 percent solution of a crosslinked linear poly(vinylbenzyl dimethylsulfonium chloride) diluted with 750 milliliters of 30 percent isopropanol. Upon completion of the addition thereof, the temperature of the resulting mixture was raised to 50° C. and maintained thereat for 4 hours. During this 4-hour interval, reaction took place whereby there was formed a crosslinked poly(S-(ar-vinylbenzyl)cysteine) in solution. Upon completion of the reaction temperature, the resulting solution was cooled to room temperature, and acidified with glacial acetic acid whereby to coagulate the polymer. The coagulated polymer was thereafter separated by filtration and repeatedly washed with 5 liters deionized water. The resulting product was found, upon analysis, to have contents of sulfur and nitrogen of 13.19 and 3.92, respectively, as compared with theoretical values of 13.51 and 5.90 percent by weight of total product; respectively calculated for a theoretical poly(S-(ar-vinylbenzyl)cysteine) upon each benzyl moiety of which a cysteine substituent appeared.

EXAMPLE 11

Preparation of poly(S-(ar-vinylbenzyl)cysteine) employing suspension polymerized beads of starting polymeric material The present example differs from Example 10, foregoing, principally in that the polymeric starting chloromethylated styrene material (in the form of its ar-dimethylsulfonium derivative) was employed in the form of suspension polymerized beads whereby to obtain a product in the form of beads. In particular, in a two-liter, three-necked, round-bottomed flask fitted, as in the previous examples, with a condenser refrigerated with solid carbon dioxide (Dry Ice), air stirrer, addition port for dry solids, and cooled over a bath of acetone and Dry Ice, ammonia was condensed to obtain approximately 700 milliliters liquid ammonia. Sodium (25 grams; 1.09 gram-atoms) was added alternately with L-cystine (60 grams; 0.25 mole). In the resulting reaction, cystine was converted to the polysodium salt of cysteine. Upon completion of the addition and, correspondingly of the reaction, the temperature of the flask and contents was allowed to equilibrate spontaneously with room temperature whereupon ammonia evaporated leaving a white, dry solid. The flask and contents was then connected with a vacuum line whereby to place the interior contents of the said flask under subatmospheric pressure to insure complete removal of the ammonia. Upon completion of the removal of ammonia, there was added, to the dry flask contents, a dispersion of 77 grams (0.5 mole) of suspension polymerized beads of a linear poly(vinylbenzyl dimethylsulfonium chloride) in 500 milliliters dioxane. Upon completion of the addition of the said beads, the temperature of the resulting mixture was raised to 65° C. at which temperature it was maintained, with stirring, for 4 hours. During this time, reaction took place whereby there was prepared a poly(S-(ar-vinylbenzyl)cysteine) product in the form of beads. The resulting suspension was then cooled to room temperature and thereafter chilled in an ice bath and acidified with acetic acid to neutralize the said reaction mixture. The resulting polymer was separated by filtration and washed with deionized water until the eluent, upon being tested with ninhydrin, showed no evidence of containing cystine or cysteine. As a result of these procedures there was obtained a preparation of beads of poly(S-(ar-vinylbenzyl)cysteine).

The other compounds comprehended within the present invention are readily prepared in procedures either identical with or departing in only minor and usual ways from the foregoing procedures. For example, when preparing the product in pilot plant or industrial quantity, the washed and filtered solid may be drum dried. Similarly, the solid may be separated from the liquid at any desired stage by, if desired, centrifugation. Also, liquid may be decanted. When it is desired to achieve continuous production, the ammonia solvent here permitted to escape may be captured, compressed or refrigerated, and reused if desired. Alternatively, depending upon the integration of the industrial plant involved, the escaping ammonia may be fed back into an ammonia pipeline system and made available unimpaired for other industrial application, or as a refrigeration system coolant. Instead of acetic acid, other mild acids may be used in the acidification step, care being taken to use an acid sufficiently mild that it does not disturb the desired product structure. As a result of this acidification step there is obtained the sodium salt of the employed acidifying acid, in relatively satisfactory purity. The acid may be selected, and this by-product salvaged, for other application, if desired.

EXAMPLE 12

The present example was carried out in essentially the manner set forth in Example 11 except that the divinylbenzene content of the starting reaction was approximately 2 weight percent of the polymerizable starting material.

The resulting product possessed essentially the chemical properties indicated for the product of Example 11, but by reason of the greater degree of crosslinking among monomeric moieties in the resulting polymer, was less swellable and therefore more satisfactory when disposed in a bed, in bead form, for the separation of enantiomorphs of amino acids as is hereinafter more fully set forth.

When it is desired to prepare other products according to the present invention, the following representative preparations are usefully employed.

When it is desired to prepare compounds according to the generic formula, foregoing, wherein $n$ is 2, a starting amino acid of choice is methionine, the employment of which according to the present invention obtains 4-(substituted benzylthio)homocysteine compounds. Whereas the employment of cystine as a starting amino acid results, by cleavage, in the formation of 2 cysteine moieties, the employment of methionine results in the liberation of methane gas. This takes place during the reflux of the amino acid with sodium in ammonia, and because of the distinctive difference in boiling temperatures, the resulting methane may easily be removed, to be salvaged or wasted, by distillation during the ammonia reflux. The identity of the substituents $Q^1$, $Q^2$ and $Q^3$ is determined by the identity of substituents upon the starting substituted benzyl halide.

Thus, employing liquid ammonia as reaction medium, and in the two-step process as hereinbefore outlined, there are prepared compounds of the present invention as follows:

From 3-chloromethylstyrene and L-cysteine, a 3-(3-vinylbenzylthio)-L-alanine.

From 1 - chloromethyl-(4-vinyl-3,5-dimethyl)-benzene and cysteine, a 3-(4-vinyl-3,5-dimethylbenzylthio)-L-alanine.

From 1-chloromethyl-(4-isopropenyl-3-methyl-5-ethyl) benzene, and L-cysteine, a 3-(4-isopropenyl-3-methyl-5-ethylbenzylthio)-L-alanine.

From L-cysteine and 1-chloromethyl-(3-bromo-5-vinyl) benzene, a 3-(5-vinyl-3-bromobenzylthio)-L-alanine.

From L-cysteine and 1-chloromethyl-(2-n-hexyl-4-vinyl) benzene, a 3-(2-n-hexyl-4-vinylbenzylthio)-L-alanine.

From L-cysteine and 1 - chloromethyl - (3-t-butyl-2-fluoro - 5 - vinyl)benzene, a 3-(3-t-butyl-2-fluoro-5-vinylbenzylthio)-L-alanine.

From L-methionine and 1-chloromethyl-(5-hexyl-4-isopropenyl - 2 - phenyl)benzene, an L - 2 - amino - 4 - (5-hexyl-4-isopropenyl-2-phenylbenzylthio)butyric acid.

From L-methionine and 4-chloromethylstyrene, an L-2-amino-4-(4-vinylbenzylthio)butric acid.

From L-methionine and 1-chloromethyl-2-phenyl-4-vinylbenzene, an L - 2 - amino-4-(2-phenyl-4-vinylbenzylthio)butyric acid.

From L-methionine and 1-chloromethyl-(5-chloro-2-phenyl - 3 - vinyl)benzene an L-2-amino-4-(5-chloro-2-phenyl-3-vinylbenzylthio)butyric acid.

From L-methionine and 1-chloromethyl-(4-cyclohexyl-2 - vinyl)benzene, an L-2-amino-4-(4-cyclohexyl-2-vinylbenzylthio)butyric acid.

From L-methionine and 1-chloromethyl-(2-chloro-5-nitro-3-vinyl)benzene, an L-2-amino-4-(2-chloro-5-nitro-3-vinylbenzylthio)butyric acid.

Further, employing liquid ammonia as reaction medium, and in the processes as hereinbefore outlined, there are prepared compounds of the present invention as follows:

From polymeric 3-chloromethylstyrene and L-cystein, a polymeric 3-(3-vinylbenzylthio)-L-alanine.

From polymeric 1-chloromethyl-4-vinyl-3,5-dimethylbenzene and L-cysteine, a polymeric 3-(4-vinyl-3,5-dimethylbenzylthio)-L-alanine.

From polymeric 1 - chloromethyl - (4-isopropenyl-3-methyl-5-ethyl)benzene, and L-cysteine, a polymeric 3-(4-isopropenyl-3-methyl-5-ethylbenzylthio)-L-alanine.

From L-methionine and polymeric 1-chloromethyl-(3-hexyl-4-isopropenyl-2-phenyl)benzene, a polymeric L-2-amino - 4 - (3 - hexyl-4-isopropenyl-2-phenylbenzylthio) butyric acid.

From L-methionine and polymeric 4-chloromethylstyrene, a polymeric L - 2 - amino-4-(4-vinylbenzylthio) butyric acid.

From L-methionine and polymeric 1-chloromethyl-2-phenyl - 4 - vinylbenzene, a polymeric L-2-amino-4-(2-phenyl-4-vinylbenzylthio)butyric acid.

From L - methionine and polymeric 1 - chloromethyl-(5 - chloro - 2-phenyl-3-vinyl)benzene a polymeric L-2-amino - 4 - (5-chloro-2-phenyl-3-vinylbenzylthio)butyric acid.

From other polymeric and non-polymeric starting materials there are prepared, according to the present invention, the corresponding polymeric and non-polymeric substituted benzylthioalanines and 4-(substituted benzylthio)-2-amino butyric acids of the present invention.

The chloromethylated aromatic compounds employed in the instant invention as starting materials are readily prepared in the manner shown in the examples. Other art methods are known. For excellent methods applicable generally in the preparation of the compounds to be used herein as starting materials, reference is made to Canadian Pats. 560,633 and 530,586. Also, for the chloromethylation of polymeric such substances, the general method employed in U.S. Pat. 2,694,702 is fully applicable.

The compounds, and especially the polymeric compounds of low solubility, according to the present invention are useful in the resolution of racemic amino acids, notably cysteine and methionine. In such use, a column of the chromatographic type is prepared in known manner, using, as resolving agent, a depth of a product of the present invention. A solvent solution of racemic amino acid of the sort described is passed into the column, and that portion of the solution issuing from the column differs from the starting solution in relative concentration of the stereoisomers. The degree of enrichment depends upon such well-recognized factors as the depth of the compound bed through which the solution is caused to pass, the molecular intimacy with which the solution is enabled to come into contact with the compound of the present invention and related factors. Also, if the flow of such solution is of enhanced velocity through the use of pressure, vacuum, or the like the degree of enrichment will be reduced as the velocity is increased. Depending upon the necessary or desired degree of enrichment longer or shorter columns may be used or passage in solution through a plurality of columns may be effected.

In general, the L-isomer tends to remain in the column until eluted therefrom by solvent and, correspondingly the D-isomer tends to appear in correspondingly enriched proportion of the fluid passing through the column. Use may be made of the fact that, especially during its transit of the column, the L-isomer is least soluble at its isoelectric point. Thus an acidic or alkaline eluent most effectively strips the bound L-isomer from the column.

For column use it may be desired to employ a highly cross-linked polymer in bead form, because more highly cros-linked polymers have less tendency to swell; excessive swelling of beads in a column is disadvantageous. Up to 50 percent of all monomer units can be cross-linking units.

EXAMPLE 13

Resolution of enantiomorphs of D,L-methionine using poly(S-(vinylbenzyl)-L-cysteine)

The following example is illustrative of the employment of the compounds of the present invention in the resolution of mixed optical isomers of amino acids. It will be noted that the example is illustrative only and that by repetitive passes of aliquots of the amino acid to be resolved, the resolution can be carried forward to greater or less degree.

A volume of 175 milliliters of the resin beads prepared as described in Example 3 was packed in a column of which the total length was 340 millimeters and the diameter 24 millimeters. After packing, the resin in the column was washed again with 10 liters of deionized water.

The resin column thus prepared was used to resolve a solution of D,L-methionine containing 33 grams of the racemic mixture in 1,000 milliliters solution. This solution was caused to pass through the resin bed in the packed column at the rate of approximately 14 milliliters per hour. Each 14 milliliter fraction was separately collected.

In order to reduce the number of samples necessary to be studied in analytical procedures, two or three consecutive samples were combined in a 50 milliliter volumetric flask and made up to 50 milliliters with water. From each of the 50 milliliter samples thus prepared, an aliquot was taken and evaporated to dryness and the weight of the residue thus obtained used to determine the concentration of methionine in each volumetric sample expressed in grams per 100 milliliters of solution. Also, each volumetric sample was used for determination of observed rotation in a 2 decimeter polarimeter tube. These procedures were carried out, consecutively, for 14 samples. The data obtained were as indicated in the following table.

TABLE 1

| Sample | Concentration grams/ 100 ml. | Degrees | | Resolution percent |
|---|---|---|---|---|
| | | Observed rotation | Specific rotation | |
| 1 | 0.0000 | 0.0000 | 0.00 | 0.00 |
| 2 | 0.0360 | 0.000 | 0.00 | 0.00 |
| 3 | 0.0700 | 0.000 | 0.00 | 0.00 |
| 4 | 0.0680 | 0.015 | 1.10 | 14.00 |
| 5 | 0.1340 | 0.020 | 0.68 | 8.00 |
| 6 | 0.7220 | 0.000 | 0.00 | 0.00 |
| 7 | 1.1180 | 0.030 | 1.34 | 16.00 |
| 8 | 1.4760 | 0.020 | 0.68 | 8.00 |
| 9 | 1.7940 | 0.060 | 1.67 | 22.00 |
| 10 | 1.7860 | 0.050 | 1.40 | 18.00 |
| 11 | 1.7680 | 0.050 | 1.41 | 18.00 |
| 12 | 1.7800 | 0.020 | 0.56 | 7.00 |
| 13 | 1.7260 | 0.050 | 1.45 | 19.00 |
| 14 | 1.8120 | 0.000 | 0.00 | 0.00 |

At the conclusion of the resolution run from which the foregoing data were derived, the column was washed with deionized water, eluent fractions collected and analyzed as above. The results indicated that the L-methionine had been held up on the beads in the column and was slowly released to the water with which the column was washed. The best fractions of wash-water indicated 44 percent resolution.

At the conclusion of these operations, the packed resin column was washed with copious amount of 0.1 N hydrochloric acid, with water, and with 0.1 N ammonium hydroxide and with further water. The resin bed thus regenerated was subsequently tested in precisely the manner of the foregoing procedures of the present example whereby it was ascertained that the regenerated resin had resolving capacity not less than that of the originally prepared bed.

By the employment of suitable other resins according to the present invention, D,L-methionine and D,L-leucine have also been resolved in good yield.

The ability to resolve amino acids into their optical isomers is of value because, for many biological (such as nutritive and medicinal) applications the desired activity of the amino acid characterizes one but not both of the enantiomorphs. The desired enantiomorph may be separatead for employment and the undesired component either pure or mixed may again be racemized and the resulting mixture again resolved whereby the total yield of the desired isomer is increased.

As examples of the biological activity of, especially, the non-polymeric compounds of the present invention, the compounds are active as insecticides; at a concentration of 0.05 pound per 100 gallons of resulting aqueous dispersion, S-(vinylbenzyl)-cysteine kills a large proportion of southern army worm larvae feeding upon vegetation sprayed to run-off therewith. Also, at a concentration of 100 parts per million parts of resulting aqueous dispersion by weight, the application of the same compound as a water spray to germinant seeds and emerging seedlings of the common grass weed *Setaria italica* gave a high proportion of kill of the seeds and germinant seedlings. Also, the compounds have value as aquatic herbicides and as selective herbicides against certain terrestrial grasses. When it is desired to employ the polymeric substances of the present invention for similar biological activity, preferance is to be given to those which are soluble in at least some solvent and of which solutions can then be dispersed in water.

The non-polymeric compounds of the present invention that have a vinyl or isopropenyl group as one of $Q^1$, $Q^2$ and $Q^3$ can be polymerized and are useful to be polymerized in direct addition polymerization characteristic of compounds having ethylenic unsaturation, as hereinbefore set forth, whereby to prepare polymeric compounds as compounds of the present invention and as derivatives of the non-polymer compounds. Polymerization procedures include techniques which, in view of the present invention, will be obvious to skilled chemists. By way of illustration, an ethylenic non-polymeric compound of the present invention placed in a colorless, covered glass container and exposed over a period of time to radiation such as sunlight or actinic artificial light or neutron bombardment undergoes a large measure of polymerization of the non-polymeric compounds. The two are readily distinguished, and separated, by solubility.

I claim:

1. Solid resinous polymer consisting essentially of recurring units of the formula:

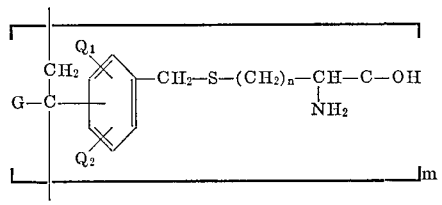

wherein G is hydrogen or methyl and the moiety

is a portion of the polymer backbone carbon chain and $m$ represents the degree of polymerization and is a number from 25 to 100,000; and each of $Q_1$ and $Q_2$ is independently selected from lower alkyl of from 1 to 4 carbon atoms, cyclohexyl, $n$ is an integer 1 or 2.

2. Solid insoluble resinous polymer consisting essentially of recurring units of the formula

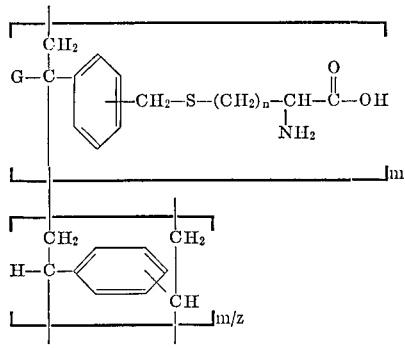

wherein G is hydrogen or methyl and the moiety

is a portion of the polymer backbone carbon chain; $m$ represents the degree of polymerization and is a number from 25 to 100,000; $m/z$ is a number of from 50 to 1,000 and $n$ is an integer 1 to 2.

3. Solid, insoluble resinous polymer consisting essentially of recurring units of the formula

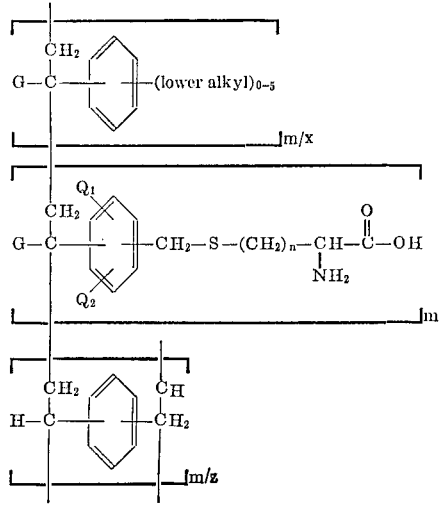

wherein G is hydrogen or methyl and the moiety

is a portion of the polymer backbone carbon chain; $m$ represents the degree of polymerization and is a number from 25 to 100,000; each of $Q_1$ and $Q_2$ is independently selected from lower alkyl of from 1 to 4 carbon atoms, cyclohexyl; $x$ is an integer from 1 to about 200; $m/z$ is a number from 50 to 1,000; and $n$ is an integer of 1 or 2.

References Cited

UNITED STATES PATENTS

| 3,022,199 | 2/1962 | Lloyd et al. | 260—79.7 |
|---|---|---|---|
| 3,078,259 | 2/1963 | Hatch et al. | 260—79.7 |
| 3,355,458 | 11/1967 | Meigs et al. | 260—78 |
| 3,388,186 | 6/1968 | Kray et al. | 260—78 |

HAROLD D. ANDERSON, Primary Examiner

U.S. Cl. X.R.

204—159.22; 260—78 UA, 516, 518 R

PO-1050
(5/69)

UNITED STATES PATENT OFFICE
CERTIFICATE OF CORRECTION

Patent No. 3,634,365          Dated 11 January 1972

Inventor(s) Carleton W. Roberts and Daniel H. Haigh

It is certified that error appears in the above-identified patent and that said Letters Patent are hereby corrected as shown below:

Column 16, line 4, delete "to" and insert --or--.

line 25, the bond should go to "CH" instead of "$CH_2$" as follows:

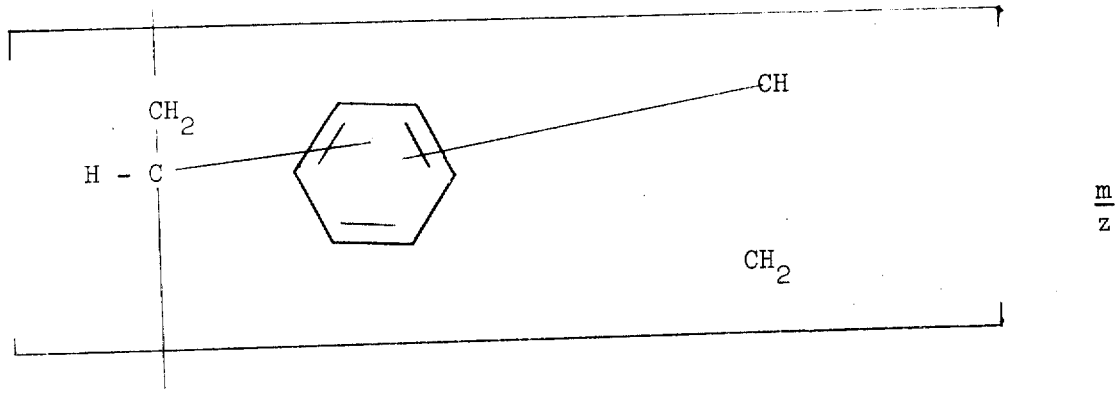

Signed and sealed this 11th day of July 1972.

(SEAL)
Attest:

EDWARD M. FLETCHER, JR.
Attesting Officer

ROBERT GOTTSCHALK
Commissioner of Patents